Oct. 31, 1961 R. R. WAGNER ET AL 3,006,393
DEVICE FOR ASSEMBLING AND TRUING RECTANGULAR FRAMES
Filed July 2, 1959 5 Sheets-Sheet 2
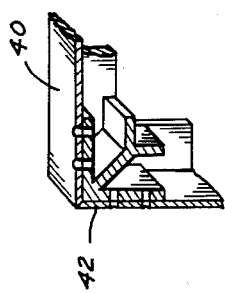
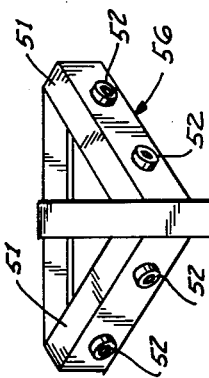
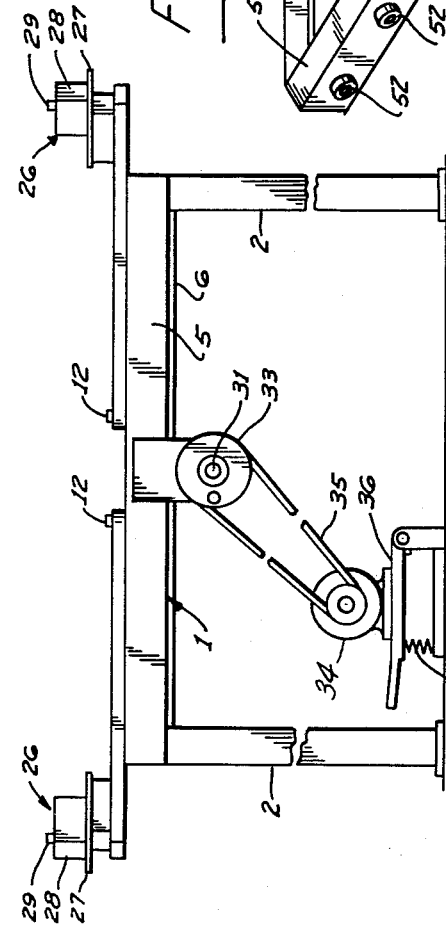
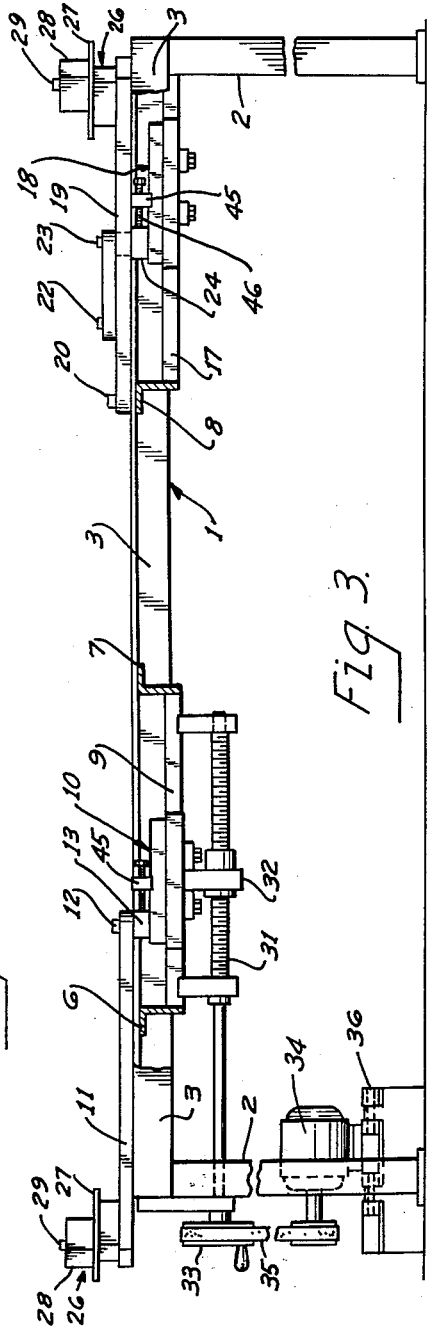
INVENTORS.
Ralph R. Wagner &
Robert C. Wagner,
by: John H. Leonard,
their ATTORNEY.

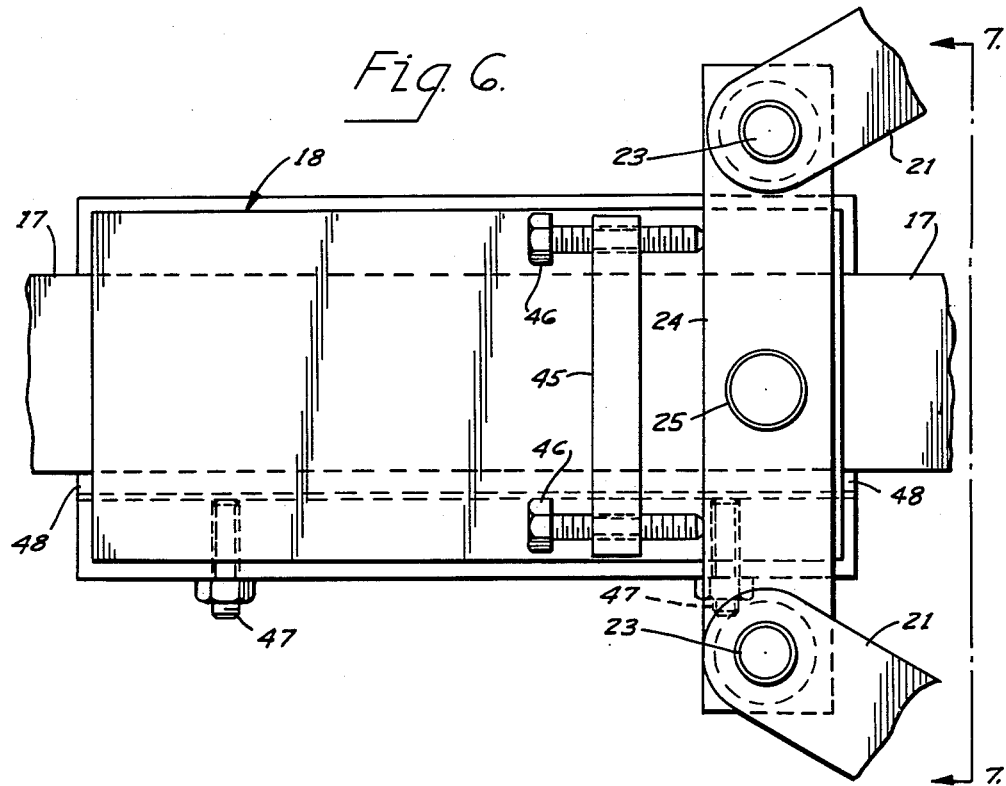
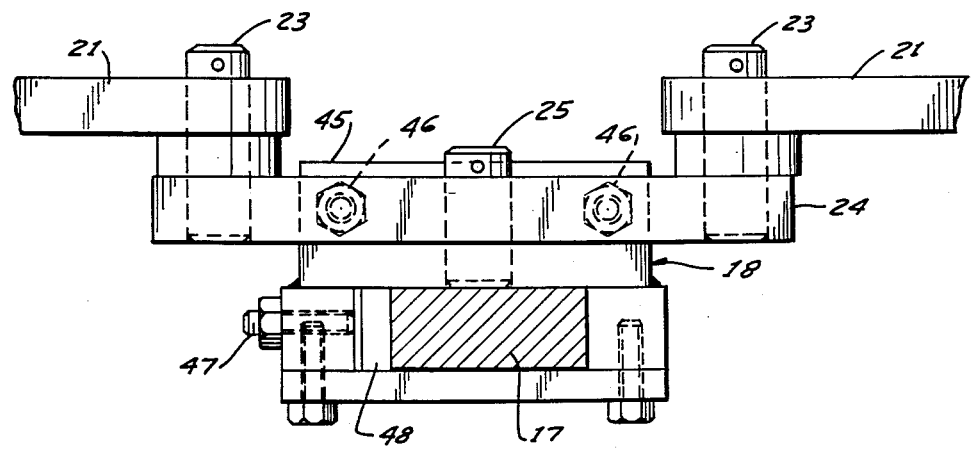

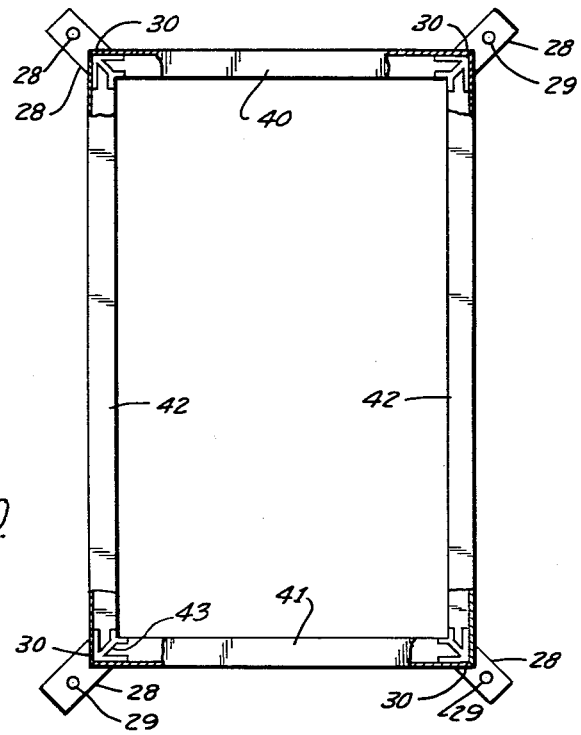
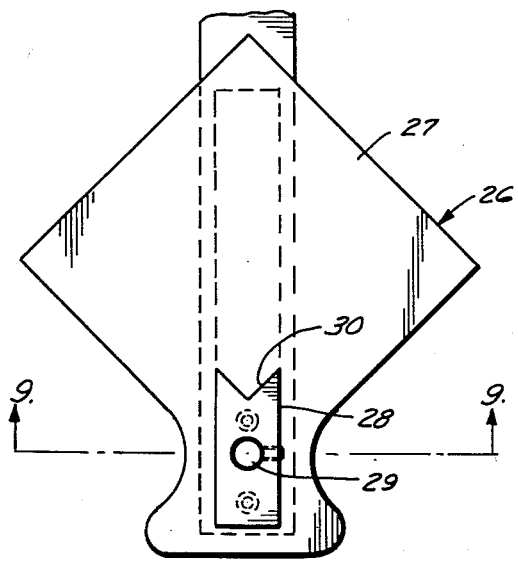
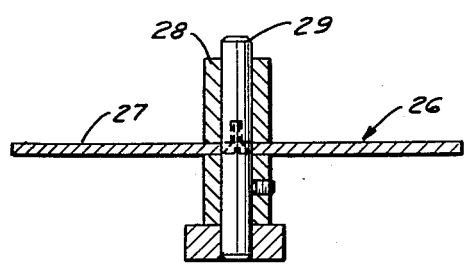

United States Patent Office 3,006,393
Patented Oct. 31, 1961

3,006,393
DEVICE FOR ASSEMBLING AND TRUING
RECTANGULAR FRAMES
Ralph R. Wagner and Robert C. Wagner, both of
R.R. 4, Bellevue, Ohio
Filed July 2, 1959, Ser. No. 824,727
3 Claims. (Cl. 144—291)

This invention relates to a device for assembling rectangular frames, and particularly to a device for assembling mitred frames for doors, windows, cabinets, and the like in which precise parallelism of the ends and sides of the frame and precisely squared corners are desired.

For the illustrative purposes, the device is shown herein in connection with the assemblage of a mitred aluminum door frame for which it is particularly adapted, its use in connection with other types of mitred frames being readily apparent from the illustrative example.

The factory assembly of aluminum doors is proving unduly expensive due to the infinite variations in the sizes of door openings and cost of shipping. The savings resulting from mass assembly in the factory are more than offset by the expense of modifying and partially reassembling the door to make it fit a door opening being different from the standards. The cost of shipping and handling of finished doors is much greater than that of the standard aluminum structural elements, not only because of greater weight of the finished and packaged door, but also because of the cost of the packaging itself, storage, damage, and the like. Furthermore, a large financial investment is necessary if a large selection of sizes of doors is to be kept on hand. Accordingly, it has become evident that fabrication of the doors by small shops located near the sites of installation would better serve the interests of the producer of the structural elements and the local tradesman, were it not for the expense of fabrication of individual doors each of different dimensions. Heretofore, this fabrication of individual doors in small shops has been done by hand, using rough jigs and the like and tedious trial and error methods of squaring the frame. The small shop cannot afford to purchase the large and expensive assembling machines and, if it could, the "set up" of the machine is too time consuming for fabricating a single door.

In assembling door frames of this general character, the greatest difficulty has been experienced in maintaining the sides and ends of the frame parallel to each other with the corner angles ninety degrees. For forming frames of this character with mitred joints, it is necessary to move the styles, the header, and sill or bottom frame member, concurrently toward a common center while maintaining the respective adjoining members as nearly as may be parallel to their final right angular positions during at least the latter portion of the assembling operation so that the gussets, which provide the mitre connections, may be readily accommodated in the corners of the frame in proper alignment and moved to proper position with respect to their associated frame members.

The present invention is directed to a device suitable for small shops and hand production from the standpoint of cost, simplicity in construction and operation, and accuracy in results obtained.

The objects of the present invention are to provide a device for this purpose which is self-adjusting during the final assembly of the frame for concurrently moving the various members forming the frame into their proper cooperative relationships with each other and so that the stiles, header and bottom sill form a substantially true rectangle.

Another object is to provide a device of this character which is adjustable so that it can accommodate a much greater range of sizes of doors or rectangular frames than could be accommodated by prior devices for the same general purpose.

Another object is to provide a device of this character which is extremely simple in design and inexpensive to construct and which does not require elaborate gearing and precision guide surfaces and like machine work heretofore required for precision operation.

A more specific object is to provide a device of this character in which the parts of the device engaging the frame members to be assembled can be moved readily into receiving position and operated without any prior precision adjustment and then driven by suitable hand or power operated drive means so as to drive and guide the frame members together, and the parts of the device being self-adjusting for forming an accurately squared frame.

Other objects and advantages will become apparent from the following description wherein reference is made to the drawings, in which:

FIGS. 1, 2 and 3 are a top plan view, a front elevation, and a right side elevation, respectively, of a device embodying the principles of the present invention;

FIG. 6 is an enlarged fragmentary top plan view of the device showing the coordinating means for moving the various parts to assure that the frame is assembled with precisely right angled corners;

FIG. 7 is an enlarged fragmentary sectional view taken on the line 7—7 in FIGS. 1 and 6;

FIG. 8 is an enlarged fragmentary top plan view showing the corner jigs of the device and their mountings;

FIG. 9 is an enlarged fragmentary vertical sectional view taken on the line 9—9 of FIG. 8;

FIG. 10 is a diagrammatic illustration of a door frame and assembly thereof;

FIG. 11 is an enlarged perspective view, partly in section, showing two frame members and the gusset in assembled relation; and FIG. 12 is a perspective view of a drilling jig used in connection with the present invention.

For purposes of convenience in reference, the device will be described as arranged to support the door frame in a horizontal position during fabrication, it being apparent from the description that the device may be placed in any other position for this purpose.

Figure 1:
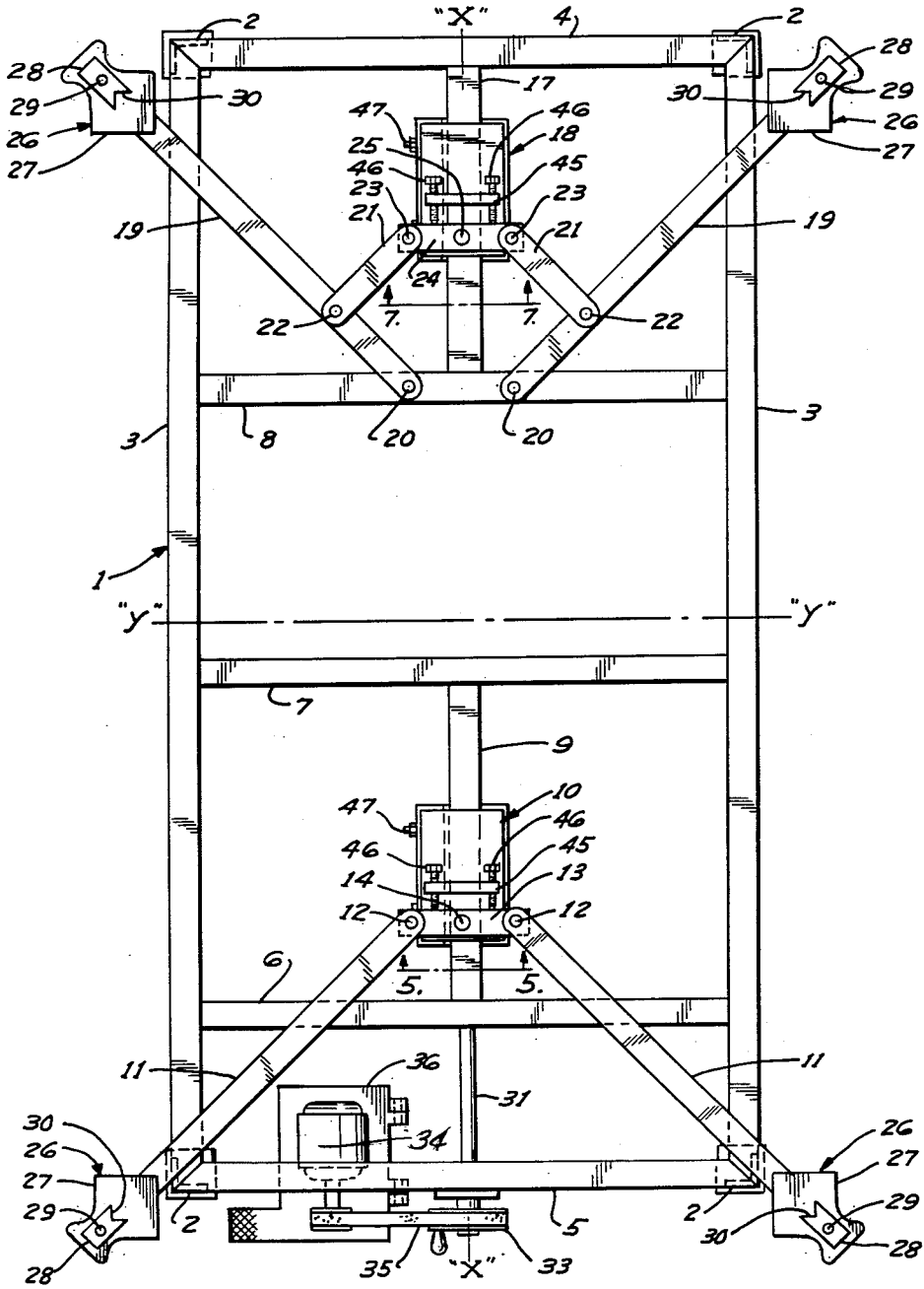

Referring first to FIGS. 1 to 3, the device comprises a horizontal frame, indicated generally at 1, supported at a convenient working level from the floor by legs 2. The specific shape and structure of the frame is of secondary importance, but the one shown for illustration comprises longitudinal sills 3, and end members 4 and 5, respectively, with cross tie members 6, 7 and 8 fixedly secured to the sills 3.

Mounted at the forward end of the frame 1 and extending horizontally, longitudinally of the frame, is a guide 9 on which is slidably mounted a carriage slide 10. Arms 11 are pivotally connected at their inner end to the carriage slide 10 for swinging transversely of the frame in a horizontal plane toward and away from each other.

For a purpose later described, the arms are connected to the carriage slide 10 by means of pivots 12 on an adjustment member 13 which is secured to the slide 10 by an upright shaft 14 for rocking about the shaft axis to different positions. In the preferred form illustrated, the arms 11 are shown as connected to swing about the different, but laterally spaced, parallel pivots 12.

At the opposite end of the frame is a guide 17 which is parallel to the guide 9 and on which is mounted a coordinating carriage in the form of a slide 18, so that the slides 10 and 18 are slidable relatively toward each other in parallel lineal paths.

Arms 19 are pivotally mounted at their inner ends on the frame 1, for free swinging movement in a horizontal plane toward and away from each other; for example, by pivotal connections 20 to the cross tie member 8 thereof.

The slide 18 is freely slidable along its guide 17. In order to operatively connect the slide 18 to the arms 19 so as to constrain the arms to move in a proper relation to each other at all times, rigid struts 21 are pivotally connected to the arms 19, respectively, for swinging about upright axes 22, the other ends of the struts 21 being pivotally connected to the slide 18 for swinging relative thereto about upright pivots 23, respectively, on the slide 18. The pivots 23 are carried on the slide through the medium of an adjustment member 24 which is secured to the slide 18 by an upright shaft 25 for rocking about an upright axis to different adjusted positions, the same as the member 13 hereinbefore described.

The struts 21 are of equal length. The axes 22 of the struts 21 are the same distance from the pivotal connections 20 of their associated arms with the cross tie members 8, respectively.

The pivots 23 are spaced equidistantly from, and at opposite sides of, a vertical reference plane, indicated at x—x extending longitudinally of the device midway between the pivotal connections 20 and midway between the pivots 12. The guides 9 and 17 are parallel to this reference plane and the slides 10 and 18 are so arranged that this relation of the axes of the pivots 12, pivotal connections 20, and pivots 23 relative to the reference plane is maintained at all times. The axes of the shafts 14 and 25 preferably are disposed in this reference plane.

If desired, both of the struts 21 may be pivotally connected to a single vertical pivot on the slide 18, both of the arms 19 may be connected to swing about a single vertical pivot on the member 8, and the arms 11 may be arranged to swing about a single vertical pivot on the slide 10. In case the pairs of members each swings about a single pivot, all of these single pivots lie in the vertical reference plane heretofore described. However, such an arrangement is not as desirable as that employing spaced pivots because of the high degree of precision required in manufacture and the fact that any error in positioning the pivots would not appear until completion of the device when correction would be difficult.

Due to the connections between the struts 21 and the coordinating carriage slide 18, between the struts 21 and the arms 19, and between the arms 19 and the member 8, the relative positions of these connections, and the lineal path of the slides 10 and 18, the arms 19 are maintained at the same angle to the vertical reference plane x—x, midway between the axes of all of the pivots, one arm 19 at one side of the plane and the other arm 19 at the other side of the plane.

Mounted on the outer ends of the arms are corner jigs, such as indicated at 26, respectively. Each corner jig 26 includes a door frame support or plate 27 with a corner engaging member 28 mounted on its upper surface. The plate 27 and member 28 are mounted for swinging, as a unit, about an upright pivot 29 on the associated arm. Each member 28 has two upright wall surfaces or shoulders 30 arranged at right angles to each other so as to be capable of engaging and accurately fitting a true right angular corner of a door frame. Since each of the members 28 is arranged to swivel or swing independently about the upright pivotal axis of its pivot 29, it is self-adjusting with respect to its associated arm and to the corner of a door frame being assembled and squared by the device.

This distance between the axis of each member 28 and the axis 12 of its associated arm 11 is the same for both arms 11. The distance between the axis of each member 28 and the pivotal connection 20 of its associated arm 19 is the same for both arms 19.

The slide 10 is drivingly connected with a suitable driving means which, in the form illustrated, is a screw 31 which extends longitudinally of said lineal path of the slide 10 and is mounted in the frame 1 for rotation in the opposite directions. In driving engagement with the screw 31 is a follower 32 which is fixedly secured on the underside of the slide 10. Thus, rotation of the screw 31 in opposite directions drives the slide 10 in opposite directions, respectively.

For rotating the screw 31, a suitable pulley 33 is mounted on the outer end of the screw 31 and is arranged to function both as a pulley for power drive and as a hand wheel for manual drive, selectively. As a power drive for the worm 31, a reversible electric motor 34 may be used. The motor 34 is drivingly connected to the pulley 33 by means of a belt 35. The motor preferably is mounted on a rock plate 36 which is kept in elevated position by means of a spring 37. In the elevated position, the belt 35 is too slack to drive the pulley 33. By depressing the rock plate 36, the belt is tightened for driving the pulley. When it is desired to drive the pulley by hand, all that is necessary is for the operator to remove his foot from the rock plate 36. If desired, he may remove the belt 35.

In operation of the device, the door frame is roughly assembled, as illustrated in FIG. 10. Therein the door frame is shown as comprising a header 40, a sill or bottom tie 41, and stiles 42. These parts are hollow aluminum channels and are assembled onto suitable gussets 43 which act as mitres and which are arranged one in each corner.

It is necessary, of course, that the header 40 and bottom sill 41, and also the stiles 42, be cut accurately to length, and also that they be cut accurately to shape at the ends if diagonal joints are desired.

The door frame thus partially assembled is positioned with its open corner portions on the plates 27, respectively, and disposed loosely between the upright shoulder walls 30 of the members 28.

In this position, the pulley 33 is rotated to drive the slide 10 toward the slide 18 at the rear of the device. As the slide 10 approaches the slide 18, the door frame members are moved concurrently toward a final position to close and square the corners.

Due to the forces transmitted to the jigs 26, as the slide 10 advances toward the slide 18, the stiles are moved endwise and concurrently urged relatively inwardly toward the vertical reference plane x—x, heretofore described, and the header and bottom sill are moved sidewise toward each other and concurrently are urged endwise to a position in which they are bisected by the reference plane.

Due to the coordinating slide 18 and the struts 21, however, the jigs 26 carried on the arms 19 are constrained to remain at all times equidistantly spaced from the vertical reference plane x—x at opposite sides thereof, this plane, as mentioned, being midway between the pivot 12, pivotal connection 20 and pivot 23 in all of the positions to which the arms 11 and 19 are swung. The arms 19, as they swing in toward each other, also maintain their jigs 26 spaced equidistantly from a transverse vertical reference plane y—y located between the slides 10 and 18. Thus the header 40 and stiles 42 are constrained at their corners so that they must finally move accurately into final position as they are driven toward each other by the jigs 26. Meanwhile, the arms 11 are free to swing unrestrained except by engagement of their jigs 26 with the corners of the door frame itself. However, the resultant forces exerted on the jigs 26 of the arms 11, by the slide 10 and, through the interposition of the door frame, by the jigs 26 of the arms 19, urge the jigs 26 at the outer end of the arms 11 inwardly toward the longitudinal reference plane and concurrently toward the transverse reference plane. These resultant forces are unequal so long as the angles of the arms 11 with the longitudinal reference plane x—x are unequal and so long as the distances between the ends of the door frame are unequal. The transverse force imposed by the jig 26 of an arm 11 is greater the farther out from the longitudinal reference plane the associated arm 11 is swung. Consequently, if one arm 11 is farther out from the plane x—x than the other, the one farther out receives a greater component of transverse force urging it toward the longitudinal reference plane x—x. This continues until the arm 11 farther out is moved inwardly so that its jig is the same distance out from the longitudinal reference plane x—x as the jig of the other arm 11. Thus, as the resultant forces move the jigs 26 of the arms 11 closer to an equidistant spacing on opposite sides of the longitudinal reference plane, the components of forces exerted thereon transversely of that plane by the arms 11 approach equality.

Consequently, the forces cause the jigs 26 to adjust themselves in a proper position which is one in which the bottom sill 41 is parallel to, and aligned endwise of the device, with the header 40 and the stiles are parallel to each other and aligned transversely of the door frame. The corners are firmly closed and squared.

Thus the pivotal connections of the free swinging arms 11 provide an equalizing means for equalizing the force applied on the opposite corners of the door, while the coordinating and constraining forces controlled by the slide 18 and struts 21 assure the holding of one end of the door in proper position relative to the longitudinal and transverse reference planes. Since equalization by the arms 11 is on opposite sides of the longitudinal reference plane and since the opposite end of the frame is constrained so that the header 40 extends equidistantly at opposite sides of the longitudinal reference plane, the jigs 26 are caused thereby to assure the forcing of all of the door frame members into a final position in which the header and sill are parallel to each other, the stiles are parallel to each other, and the corners of the resulting frame are closed and square.

As mentioned, it is desirable that a slight adjustment be provided so that the pivots 12 and 23 can be adjustably positioned, after the device is assembled, so as to square the door frame.

For this purpose, the pivots 12 are adjustable on the slide 10 and the pivots 23 are adjustable on the slide 18. It is for this purpose that the adjustment members 13 and 24 are provided on the slides 10 and 18, respectively.

Since both adjustment members and the lateral adjustment of their slides are correspondingly arranged and function in like manner, only the member 13 on the slide 10 and the lateral adjustment of the slide 10 will be described in detail.

Figure 4:
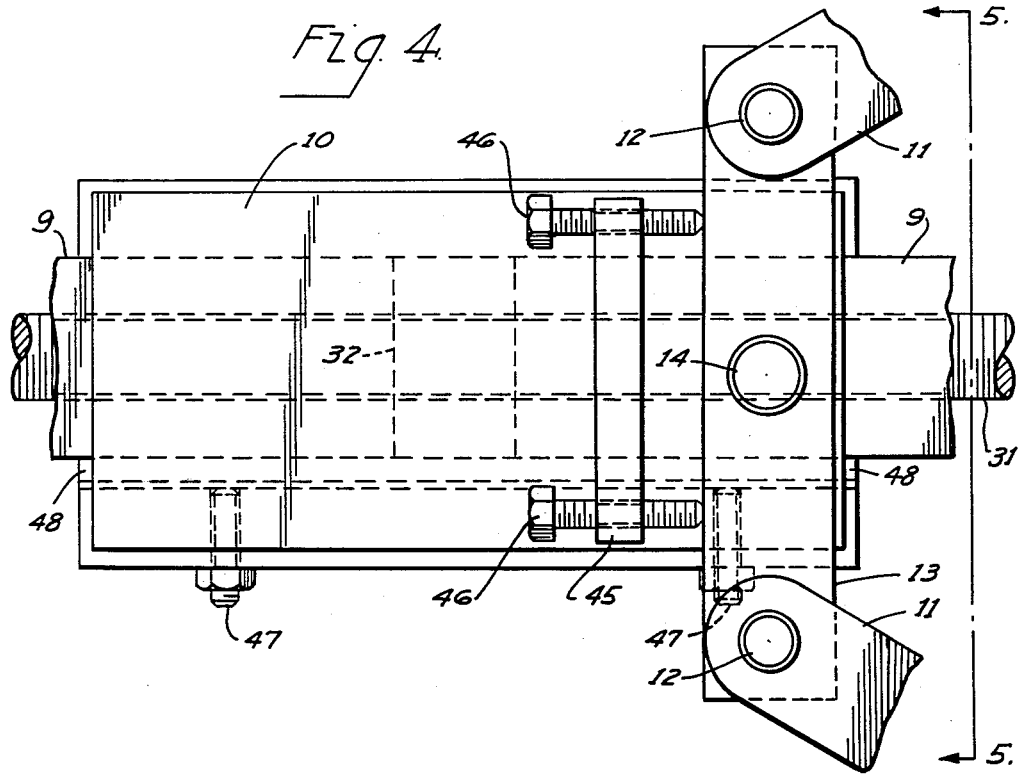
FIG. 4 is an enlarged fragmentary top plan view of the device showing the driven slide used therein, and a microadjustment thereon.
Figure 5:
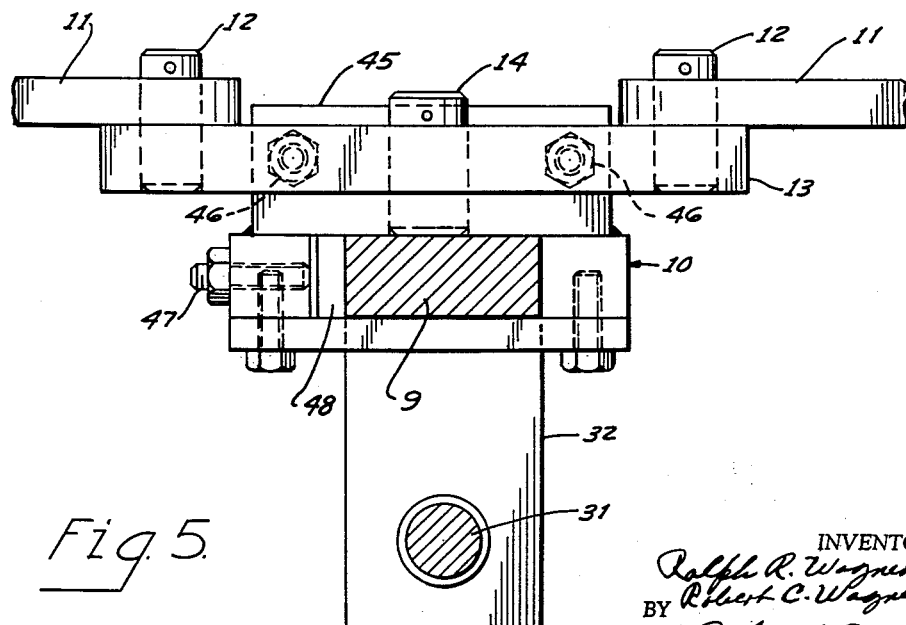
FIG. 5 is an enlarged fragmentary vertical sectional view taken on the line 5—5 of FIGS. 1 and 4.

Referring to FIGS. 4 and 5 as mentioned, the member 13 is mounted for rocking movement about the axis of the shaft 14. In order to rock the member 13 to adjusted positions, selectively, and secure it in the selected position, a rigid bar 45 is secured in fixed position on the slide 10 adjacent the rear face of the member 13. Suitable adjusting bolts 46 are threadably connected to the bar and protrude therefrom at the forward face thereof and engage the rear face of the member 13. By manipulating the bolts 46, the member 13 can be rocked to different adjusted positions about the axis of the shaft 14 and locked in the adjusted position selected. This adjustment positions the pivots 12 in proper position forwardly and rearwardly while they remain always at equal distances laterally from the reference plane x—x.

In order to shift them and the reference plane laterally to assure proper operation, the slide 10 is provided with a guide bar 48 which is adjustable transversely of the slide 10 by adjustment bolts or screw 47, suitable shims being introduced between the sides of the guide 9 and the carriage 10 and bar 48, as desired.

As a result of this arrangement, the pivots on the slides 10 and 18 can be adjusted to proper positions, and locked in those positions, to assure that the door frame is square. Once this adjustment is made, it is not changed but is the same for all rectangular frames assembled by the device.

If desired, a suitable drill guiding jig 56 may be provided and arranged so that it can be placed on the door frame corners, while the frame and corners are held by the jigs 26, and can guide a drill into the proper relation to the door frame members and gussets. The drill jig may comprise side frame elements 51 of angular cross section and adapted to fix a door corner, the elements 51 being provided with proper holes 52 for guiding a drill. A tie member 53 may be secured to the elements and provided with an aperture to receive one of the pivots 29.

By virtue of this arrangement, the door frame can be drawn to precise dimensions and squared shape, held in such position by the device, then drilled and, while still held by the device, fastened by screws which are inserted through the frame members and gussets for permanently securing the door frame members together, thus eliminating the necessity of attempting to draw the frame to dimensional and angular accuracy by the connecting screws, as has been a common and unsatisfactory practice heretofore.

Having thus described our invention, we claim:

1. A device for assembling and squaring rectangular frames and comprising a support, a stationary member thereon, a movable member mounted on the support for movement relative thereto toward and away from the stationary member in a lineal path parallel to the plane in which the frame is to be supported, drive means for driving the movable member in opposite directions, selectively, along said path, two pairs of arms, the arms of one pair being pivotally connected at their inner ends to the stationary member for swinging movement parallel to said plane in a direction toward and away from a reference plane through, and extending endwise of, said path and normal to said predetermined plane at opposite sides of said reference plane, to different positions, the arms of the other pair being connected at their inner ends to the movable member for swinging movement independently of each other parallel to said predetermined plane at opposite sides of, and toward and away from, said reference plane to different positions which are independent of the position of the movable member along said path, coordinating means connecting the arms of said one pair and the support for constraining said arms of said one pair to swing at all times in equi-angular relation to said reference plane to said different positions, corner engaging jigs pivotally mounted on the outer ends of the arms, respectively, for free movement about axes normal to said predetermined plane, said jigs being disposed for receiving the corners of a rectangular frame while the frame is disposed thereon parallel to said predetermined plane, and for self-adjustment about their respective pivotal axes, relative to their associated arms, into corner fitting positions, relative to the frame.

2. The device according to claim 1 wherein the connection between at least one of the pairs of arms and the associated member to which they are connected is by adjustable means connected to said last mentioned pair of arms and connectable to the last mentioned associated member, and including additional means for connecting the adjustable means fixedly to the last mentioned associated member in preselected positions, respectively, transversely of the said reference plane.

3. A device for assembling rectangular frames and comprising a support, two pairs of corner engaging jigs carried thereby and adapted to engage the corners of a frame, means supporting the jigs for movement in a predetermined plane parallel to the plane in which the frame is to be supported and toward and away from a longitudinal reference plane and a transverse reference plane which are at right angles to each other and to the predetermined plane, coordinating means constraining the jigs of one pair to move toward said longitudinal plane as they move away from said transverse plane and away from the longitudinal plane as they move toward the transverse plane and so that they are at all times equi-distant from said transverse plane at the same side thereof and are equi-distant from the longitudinal plane at opposite sides thereof, the jigs of the other pair being movable relative to each other independently of each other toward and away from said longitudinal plane independently of their movement toward and away from said transverse plane, the jigs of said one pair being at one side of said transverse plane and those of said other pair being at the opposite side of said transverse plane force applying means for urging the jigs of one pair relatively toward the jigs of the other pair, and pivot means respective to the jigs and supporting the jigs for self alignment in the plane of, and relative to, the corners of a frame engaged thereby.

References Cited in the file of this patent

UNITED STATES PATENTS

| | | |
|---|---|---|
| 149,425 | Banks et al. | Apr. 7, 1874 |
| 390,165 | Hall | Sept. 25, 1888 |
| 840,777 | Lawson | Jan. 8, 1907 |
| 1,193,611 | Richardson | Aug. 8, 1916 |
| 1,342,892 | Bergstrom | June 8, 1920 |
| 2,437,233 | Smith | Mar. 2, 1948 |

FOREIGN PATENTS

| | | |
|---|---|---|
| 21,898 | Great Britain | Oct. 31, 1901 |
| 39,185 | Denmark | Sept. 3, 1928 |